This is a continuation-in-part application of U.S. Serial No. 232,107, filed October 22, 1962, now abandoned.

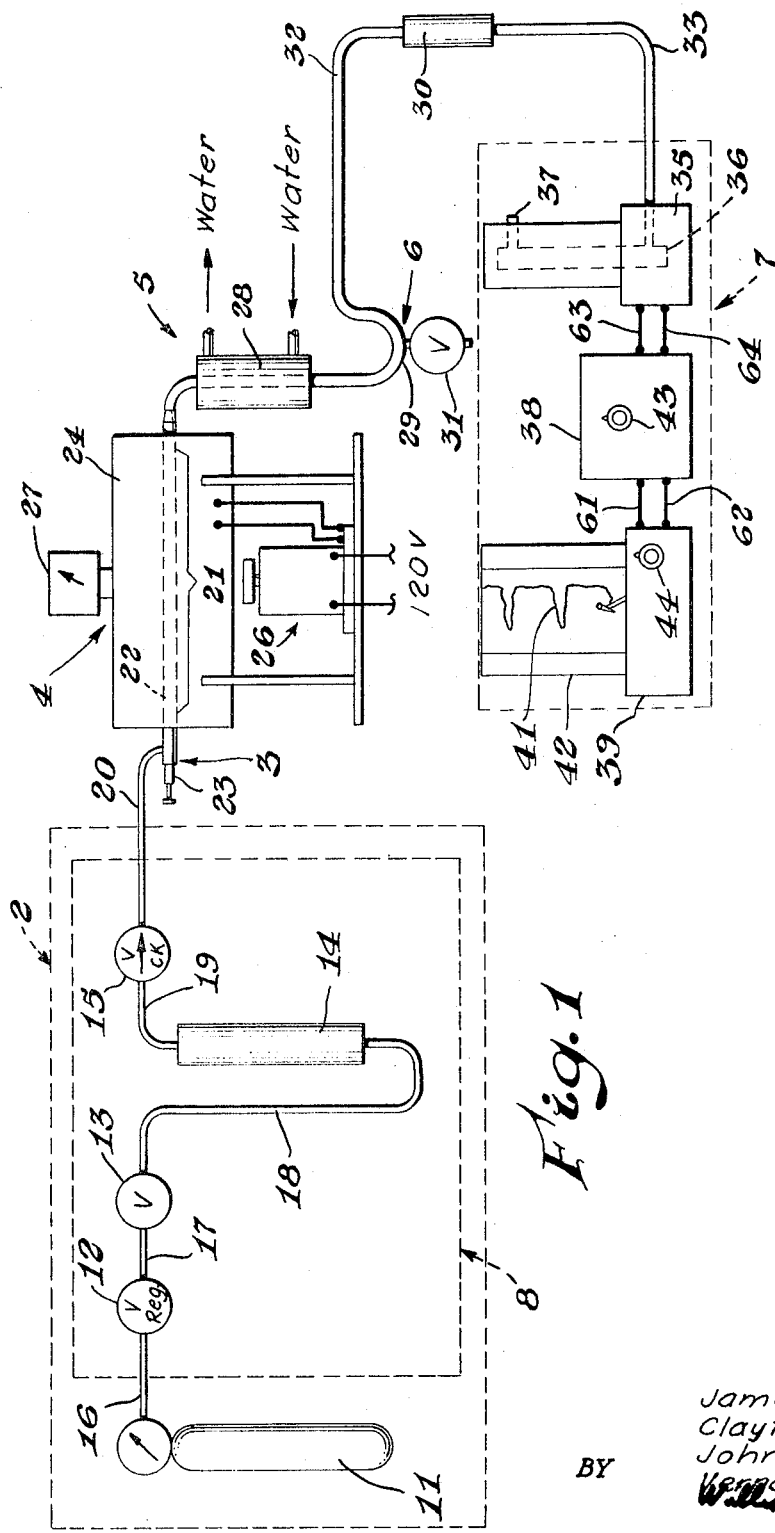
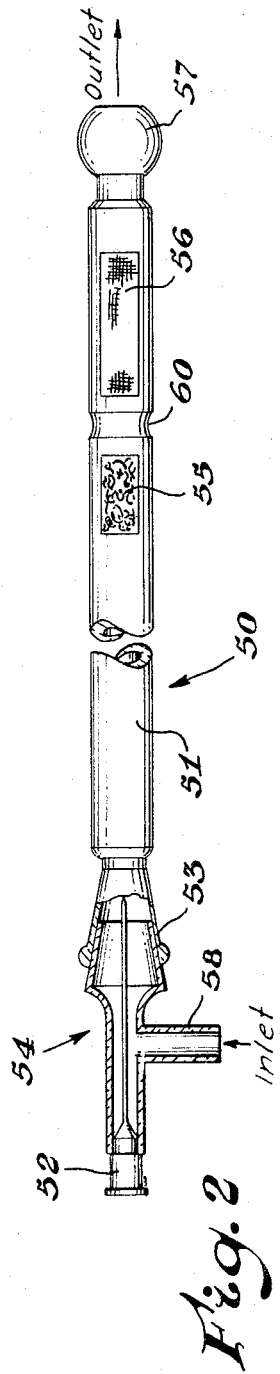
Fig. 1
Fig. 2
INVENTORS.
James L. Teal
Clayton E. Van Hall
John W. Safranko
Vernon A. Stenger
BY William C. Hall
ATTORNEY 3,296,435
METHOD AND APPARATUS FOR DETERMINING THE TOTAL CARBON CONTENT OF AQUEOUS SYSTEMS
James L. Teal, Clayton E. Van Hall, and Vernon A. Stenger, Midland, Mich., and John W. Safranko, Rancho Cordova, Calif., assignors to The Dow Chemical Company, Midland, Mich., a corporation of Delaware
Filed July 6, 1964, Ser. No. 380,597
15 Claims. (Cl. 250—43.5)

The present invention concerns a novel analytical method and apparatus for determining the carbon content of aqueous systems containing small amounts of dissolved or highly dispersed carbonaceous materials.

Accepted methods for analyzing aqueous systems for carbonaceous or organic materials are generally based upon wet oxidation techniques, i.e., using chemical reagents at moderate temperatures. The amount of carbonaceous material is determined by the amount of oxidant consumed which may be found volumetrically or photometrically, or is determined by the quantity of carbon dioxide evolved which may be found by manometric, gravimetric or alkalimetric procedures. In addition, thermal conductivity and mass spectrometry have been utilized to determine the carbon dioxide. These methods, though some are widely used, suffer from the variable susceptibility of organic compounds to oxidation by commonly used reagents such as chromic acid, the interference of chloride and other ions and the length of time required to complete the analysis.

Increasing concern with the problem of water pollution and waste treatment has brought about a need for a rapid and precise method for determining carbonaceous matter in aqueous systems. The advantages of rapid analytical methods permitting immediate evaluation of corrective treatments at water pollution sources are manifest.

It is an object of the present invention to provide a rapid analytical method for determining the total carbon content of aqueous systems containing small amounts of highly dispersed carbonaceous matter, i.e., homogeneous aqueous dispersions or solutions of carbonaceous solids or liquids. The total carbon content of such a system is a convenient indicator of the total carbonaceous matter therein. Particularly, it is an object to provide an analytical method effective regardless of whether the carbonaceous matter is present in the form of a true solution, or as a homogeneous dispersion of finely divided solid particles. An additional object is to provide a highly accurate and reproducible analytical method conveniently adaptable for water pollution control purposes. A further object is to provide an apparatus for carrying out the aforedescribed analytical method. Other objects will become apparent hereinafter as the invention is more fully described.

In accordance with the invention, an analytical method is provided whereby the total carbon content of an aqueous system containing carbonaceous matter is determined with an accuracy of plus or minus a few parts per million. The analytical method comprises the following operations. A stream of oxygen is passed, at a constant rate, through a heated zone within a combustion conduit. Contained within the heated zone of the conduit and disposed transversely across the same is a porous, gas-permeable diffusing member of a material essentially chemically inert to oxygen and steam at an elevated combustion-supporting temperature, e.g., 900° C. The diffusing member is positioned within the heated zone of the combustion conduit at some distance from the oxygen inlet end of the heated zone sufficient to define, in conjunction with the conduit, a sample expansion zone. Usually, it is positioned at least about ⅓ of the distance through the heated zone as measured from the oxygen inlet end thereof. Preferably, it is positioned about ½ to ¾ of the way through the heated zone. By so positioning the diffusing member, which may be otherwise termed a gas-permeable, diffusing plug, there is provided a sample expansion zone in which a substantial blanket of oxygen is maintained upstream from the diffusing member and within the heated zone of the combustion conduit during operation of the apparatus. Upon injection of the test sample of the aqueous system to be analyzed, the sample is vaporized and for an instant some back pressure is generated. The volume of the sample expansion zone is adequate when the formation of condensate in the inlet oxygen stream or other cool zones upstream from, and communicating with, the heated zone is avoided.

Having established the oxygen stream at a predetermined, constant rate of flow (predetermined means at a preset level—knowledge of absolute flow rates is not necessary) and brought the heated zone of the combustion conduit to a suitable combustion temperature, i.e., at least about 700° C., preferably about 900° C., but below about 1,100° C., a small amount of an aqueous system containing a small proportion of highly dispersed carbonaceous matter is rapidly injected into the heated zone of the combustion conduit on the upstream side of the diffusing member. While the oxygen stream preferably consists of pure oxygen, gaseous diluents, substantially free of carbonaceous materials, such as nitrogen, oxygen, helium and the like, can be tolerated as components of the oxygen stream. Best results are obtained if the sample is rapidly injected into the heated zone in a direction parallel, or practically parallel, to the longitudinal axis of the combustion conduit. When the combustion conduit is aligned vertically, rapid injection of the sample can be achieved by dropping it into the combustion zone. In any event, the sample is deposited within the heated zone of the combustion conduit at a point which is some distance from the oxygen inlet end of the heated zone.

When the line of injection is essentially parallel to the longitudinal axis of the combustion conduit, rapid injection techniques will deposit the aqueous sample within the heated zone at or near the diffusing member. Thus, by virtue of the position of the diffusing member there is a cushioning oxygen blanket on the upstream side of the gasified injected sample which aids in preventing back flow of the resulting gaseous product out of the heated zone. The steam and vaporized carbonaceous matter, which are produced substantially instantaneously upon injection of the sample, are subsequently swept through the remainder of the heating zone and the diffusing member into a confined cooling zone.

While there is undoubtedly some oxidation of the carbonaceous matter present in the sample upon vaporization thereof, it is essential for complete and reproducible combustion that the gasified sample pass through the diffusing member. It insures retention of the gaseous product within the heated zone long enough to achieve complete combustion and provides a reservoir of both heat and oxygen to complete the oxidation of any carbonaceous matter present.

Within the cooling zone following the heating zone, the gaseous product from the heating zone is usually cooled to a temperature at or below that of the apparatus subsequently used for detecting the carbon dioxide. This is done to avoid the build-up of condensate in the detector. Normally, the gaseous product will be reduced to about normal room temperatures. As the gases cool, water vapor condenses and is thereby effectively separated from the gas stream to be analyzed. Such condensate is usually collected in a water trap from which accumulated water can be intermittently withdrawn. While uniform cooling of the gaseous product and thus consistent separation of condensate from the cooled gases are desirable for optimum operation, good results can also be achieved by operating with only minimal cooling of the gaseous product such as would occur incidentally while conveying the gases into the analyzer through air-cooled tubing.

After flowing through the cooling zone, the cooled gaseous product passes into an analyzer for quantitatively determining its carbon dioxide content. Preferably, an analyzer is used which provides a signal in the form of electrical voltage, the strength of which is proportional to the concentration of carbon dioxide in the effluent gases.

A particular, and preferred, analyzer is a non-dispersive type, infrared analyzer sensitized for carbon dioxide analysis. The construction of these analyzers and the manner in which they are operated are described in such references as United States Patents 2,698,390, 2,681,415, and 2,709,751.

The voltage signal output from such carbon dioxide analyzer is adapted by suitable amplifiers, e.g., that described in U.S. Patent 2,413,788, and graphic recorders to provide readings which can be converted to, or read directly as, carbon dioxide concentrations in the sample by reference to standard calibration curves prepared by analyzing known samples under comparable operating conditions. To provide comparable analytical readings for such purposes, care must be exercised to insure that sample volume, amplifier gain and recorder voltage range settings are at predetermined identical values and further that the temperature and the oxygen flow rates employed during the analytical operations are identical, or at least above minimum operational levels at which the analytical results become independent of these variables.

In a preferred embodiment wherein analytical results are obtained as a curve whose amplitude is a function of carbon dioxide concentration in the gaseous product, the actual carbon content of the aqueous system tested is correlated with the maximum amplitude, or peak, of the curve. Having previously calibrated such readings, direct readings of the peak ordinants give the carbon concentration in the aqueous system tested.

It will be recognized that the above-described procedure provides information with regard to the total carbon content of aqueous systems inclusive of carbon present in inorganic as well as organic forms. However, for most aqueous systems the actual organic carbon content can be approximated by first treating the sample to be analyzed to remove any inorganic carbon (carbonate) therein. This is accomplished by acidifying the sample with a mineral acid of sufficient strength to liberate any carbonates present as carbon dioxide and thereafter blowing the sample with a carbon dioxide-free, inert gas.

A major problem involved in the development of the aforedescribed process was the relatively large volume of steam produced when water is placed in the heating zone. As calculated from ideal gas behavior, one milliliter of water yields 5.6 liters of steam at 950° C. The great expansion of a sample on vaporization causes the gas produced to blow through the combustion conduit with high velocity making complete and reproducible oxidation difficult. In order to obtain complete and reproducible oxidation of organic matter contained in the aqueous sample under these conditions, it was found to be essential to employ small samples of the aqueous system to be tested and to have a diffusing member suitably placed in the heated zone of the combustion conduit. In this connection, it has been found desirable to maintain the volume of the aqueous test sample within the range from about 0.005 to about 0.5 percent, preferably 0.01 to 0.1 percent, of the bed volume. By "bed volume" is meant the total volume of the heated zone within the combustion conduit. For best results, the heated zone bed volumes are maintained within the range from about 20 to 200 cubic centimeters, while bed volumes of 40 to 100 cubic centimeters are preferred. Along with the heated zone bed volume, it is desirable to control the cross sectional area of the combustion conduit. For a cylindrical combustion conduit, the maximum diameter permissible is about 3 centimeters. Preferably, the maximum diameter is kept below about 2 centimeters. In any event, the combustion conduit should not have a cross sectional area exceeding about 7 square centimeters. The smallest cross sectional area permissible is that which will just allow for rapid expansion of the aqueous test sample without consequential rupturing of the combustion conduit.

While the quantity of carbonaceous matter contained in the aqueous test sample is small, e.g., from a few parts up to as much as 500 parts per million, and not much oxygen is required for its complete oxidation, it is nevertheless essential to provide ample opportunity for contact between the carbonaceous matter and oxygen. This is accomplished by the provision of the diffusing member. Even though the bulk of the oxygen atmosphere in the combustion conduit is replaced by steam upon vaporization of the test sample, the diffusing member contains sufficient oxygen usually in an adsorbed condition, and stored heat to promote complete oxidation of the carbonaceous matter in the test sample.

In addition to meeting the foregoing requirements, diffusing members employed herein must be sufficiently permeable to gases in order to prevent the creation of excessive back pressures upon vaporization of the aqueous test samples. To provide an effective balance between the conflicting requirements of low resistance to gas flow over and against the requirement for providing sufficient oxygen and heat to complete oxidation of injected carbonaceous matter, it has been found desirable to utilize diffusing members, i.e., gas-permeable, diffusing plugs filling the combustion conduit, at least 0.5 centimeter long with a maximum limit of about 10 centimeters. Preferably, the diffusing member is from 1 to 4 centimeters long and is constructed of a compacted fibrous or granular material essentially chemically inert to oxygen and steam. "Essentially chemically inert" means the material adopts an essentially constant chemical consistency upon exposure to steam and oxygen, at an elevated combustion supporting temperature, except that it is contemplated herein that the surface of such material may adsorb or desorb gases such as oxygen. Suitable materials of construction for the diffusing member include quartz wool, quartz chips, sand, pumice, and the like siliceous materials. Also suitable are finely divided transition metals, e.g., nickel, chrome, manganese and platinum, and transition metal oxides, e.g., copper, cobalt, manganese, vanadium, cerium and thorium oxides, employed either alone or on inert support surfaces. Preferred for this use is fibrous asbestos which may be, if desired, coated with an oxide of a transition metal. Cobalt oxide is efficient in the presence of steam. Since the oxidation must take place so rapidly, a platinum gauze downstream in the heated zone from the diffusing member in the heated zone may also be used to insure complete and reproducible oxidation.

It is to be noted that the situation encountered herein is quite different from that involved in ordinary microcombustion techniques wherein complete oxidation of the sample to be analyzed is accomplished over an extended period in a slow stream of oxygen.

Typical apparatus for carrying out the above-described analytical process is illustrated in the accompanying drawings. FIGURE 1 is a schematic drawing of a complete apparatus suitable for accomplishing the analysis of dilute aqueous systems of carbonaceous materials for carbon content in accordance with the invention. FIGURE 2 shows the general configuration of a representative combustion conduit containing a diffusing member and an optional platinum gauze.

The apparatus illustrated in FIGURE 1 comprises oxygen supply means 2, sample injection means 3, heating means 4, in which there is situated a combustion conduit 22, cooling means 5, condensate removal means 6 integral with the cooling means 5, and carbon dioxide detection means 7. More particularly, there is shown in the illustrated preferred embodiment regulated oxygen supply means 2 which comprises an oxygen tank 11 for feeding oxygen to the combustion conduit 22 through oxygen flow control means 8, which in the illustrated embodiment consists of a series arrangement of a pressure regulator 12, valve 13, flow meter 14, and back flow check valve 15. These elements of the apparatus are operatively coupled in the order specified with suitable interconnecting conduits 16, 17, 18, 19 and 20, respectively. Subsequent to the check valve 15, the oxygen stream is introduced into the inlet end of the combustion conduit 22, which is adapted at the oxygen inlet end to receive sample injection means 3, such as the illustrated syringe 23.

The combustion conduit 22 has a heating zone 21 situated within the heating means 4, which, in the illustration, is an electric muffle furnace 24. This furnace is regulated by means of a variable power control 26. Temperature readings within the heating means 4, if desired, can be obtained by means of a pyrometer 27.

Gaseous products from the heating zone 21 of the combustion conduit 22 are passed through cooling means 5, which, in the illustrated preferred embodiment, consists of a water-cooled condenser 28 in series with condensate removal means 6 and an optional gas filter 30. The specific condensate removal means 6 illustrated consists of a U-shaped condensate trap 29 adapted with a stopcock 31 for intermittent water drainage. The water-cooled condenser 28 is coupled directly to the outlet or discharge end of the combustion conduit 22 and it discharges directly into the condensate trap 29. Interconnecting conduits 32 and 33 thereafter conduct the gaseous product through the gas filter 30 and thence into carbon dioxide detection means 7.

The carbon dioxide detection means shown in FIGURE 1 consists of an electrically interconnected association of a non-dispersive, carbon-dioxide-sensitized, infrared analyzer 35 which produces a variable voltage signal to be amplified by means of a low voltage amplifier 38. The enhanced electrical signal is then fed into a continuous graphic recorder 39, which produces a curve 41 on a continuous strip of paper 42. The amplitude of, or the area under, the curve 41 is a function of the carbon dioxide concentration in the detection cell 36 of the infrared analyzer 35. After passing through the detection cell 36 the gaseous product is discharged to the atmosphere through a vent 37. Essential controls in the detection means 7 are the amplifier gain control 43 and the recording voltage range control 44.

In FIGURE 2, a representative combustion conduit 50 is shown in more detail. It consists of two separable parts which are an oxygen inlet 54 and a cylindrical combustion tube 51. Seated within the oxygen inlet 54 is an injection tube 52 adapted to receive injection means in the form of a syringe. The injection tube 52 is aligned in a direction essentially parallel to the longitudinal axis of the combustion tube 51. The oxygen inlet 54 is coupled with the cylindrical combustion tube 51 by means of a ground glass joint 53. Within the cylindrical combustion tube 51 is a diffusing member 55. Subsequent thereto in the direction of the oxygen stream is an optional platinum gauze 56. Between the diffusing member 55 and the platinum gauze 56 is a small retaining indentation 60 in the cylindrical combustion tube 51. This provides a retaining seat for the diffusing member 55. Each end of the assembled combustion conduit 50 is adapted for coupling with preceding and succeeding apparatus elements. The upstream oxygen inlet is a small tubular nipple 58 and the downstream outlet, coupling means is a ball portion 57 of a ball joint.

While certain preferred embodiments of the above-described fundamental apparatus components have been set forth, numerous alternatives will occur to those skilled in the art. For instance, with regard to oxygen supply means 2, it is only necessary that there be provided a confined stream of oxygen subject to precise flow rate control. Knowledge of the actual flow rate is not necessary, however, so long as the oxygen flow rate can be controlled to a predetermined and constant rate. To this end any combination of mechanical means for supplying and regulating an oxygen stream can be used in place of that illustrated. Insofar as heating means 4 is concerned, apparatus capable of providing controlled heating over a temperature range of 700° to 1,100° C. can be used. While an electric resistance furnace is efficient for this purpose, induction heating means, or any other convenient heating means, can be used. Similarly, sample injection means 3 can be provided by any mechanical apparatus capable of supplying measured aliquots of aqueous systems and rapidly injecting them into the heating zone 21 of the combustion conduit 22. For example, direct insertion of the aqueous sample to be analyzed into the heating zone 21 can be accomplished by oxygen driven sprayers adapted to provide controlled amounts of spray. Cooling of gaseous products from the heating zone 21 can be accomplished in a conventional manner such as by passing them through the described water-cooled condenser 28. Alternately, air-cooled condenser, which may be simply the coupling tubing between the combustion conduit and the analyzer, are also effective for this purpose. While it is not necessary in every case, it is preferred to employ a gas filter 30 which will separate any particles or moisture entrained in the gaseous product prior to its introduction into the detection cell 36. While the particular carbon dioxide detection means 7 described above is preferred, any analytical apparatus capable of indicating the quantity of carbon dioxide in the gaseous product with desired sensitviity and specificity can be used.

Materials of construction employed in the above combustion gas train must generally meet the criteria of having resistance to oxygen and moisture. Moreover, it is desirable, at least in the gaseous product train, that materials of construction be essentially non-adsorbents for carbon dioxide. Within the combustion zone itself, it is necessary that the materials of construction be inert to oxygen and steam at the elevated temperatures used for combustion. Such materials include, for example, fused silica, Vycor glass, glazed ceramics and the like siliceous materials.

In a specific embodiment of the abovedescribed apparatus shown in FIGURE 1, $3/16$ inch gum rubber tubing was utilized to provide the connecting conduits 16, 17, 18, 19 and 20. The oxygen stream pressure regulator 12 was a Watts Regulator Type 26 Model M1 and the valve 13 consisted of a Hoke needle valve. A combination of a precision sapphire ball within a Fisher-Porter Flow Metering Tube 08F-1/16-20-4/74 served as the flow meter 14. Serving as the check valve 15 was a Kimble Valve No. 38006. Combustion supporting temperatures were generated within the combustion conduit 22 with an electric muffle furnace 24 operating on a voltage of 120 volts and a maximum power consumption of 700 watts. The power control 26 was a Powerstat variable voltage transformer.

A cylindrical combustion tube 51 consisting of fused silica and having an inside diameter of 1.27 centimeters and a length of about 30 centimeters was used in the construction of the heated zone 21 of the combustion conduit 50. An oxygen inlet 54 was provided in the form of a tubular glass T, with the cross bar of the T having a Vycor ground glass joint 53 at one end for coupling with the fused silica combustion tube 51 and a No. 18 stainless steel syringe needle 52 about 5.2 centimeters long seated in the opposite end of the cross bar as receiving means for sample injection means in the form of a syringe. When the components of the combustion conduit 50 were assembled, the needle 52 was directed in a line essentially parallel with the longitudinal axis of the combustion tube 51. The stem of the tubular glass T provided a nipple 58 for connection with the 3/16 inch gum rubber interconnecting conduit 20. A Hamilton No. 705N syringe 23 was employed as the injection means 3.

Within the combustion tube 51 at about 22 centimeters from the inlet end thereof was placed a diffusing member 55 about 4 centimeters long constructed of ignited asbestos fibers. The diffusing member was formed by gently tamping the fibers into place against a retaining indentation 60 within the combustion tube 51 with a glass rod. A platinum gauze 56 about 10 centimeters long was placed just behind the diffusing member 55. After assembling its component parts, the combustion conduit 50 was placed within the electric muffle furnace 24 so that the tip of the syringe needle 52 was just outside the heating zone of the furnace 24 but yet in position such that, upon injection of the aqueous sample, the full amount thereof was deposited within the heating zone 21 of the combustion conduit 22.

The gaseous products produced upon injection of a test sample were conducted through a gas train consisting of a series arrangement of a water-cooled condenser 28, a U-shaped water trap 29 and a gas filter 30 containing a 10–13 micron filtering element. The water trap 29 was adapted for intermittent drainage of accumulated water by means of a stopcock 31. The interconnecting conduits 32 and 33 consisted of 3/16 inch gum rubber tubing.

Carbon dioxide detection means 7 employed with the foregoing apparatus consisted of an infrared analyzer 35 (Beckman Model 21A) equipped with a 13.3 centimeter detection cell 36 sensitized for analysis of carbon dioxide. The detection cell 36 was maintained at a temperature of 45° C. to prevent the formation of condensate which would interfere with the accuracy of the analytical result. Output from the analyzer 35 was fed by electrical leads 63 and 64 to a low voltage amplifier 38. Subsequently, the amplified output of the analyzer was fed into a graphic recorder 39 (Sargent Model MR) through electrical leads 61 and 62. The recorder 39 was set by the voltage recording range control 44 to operate in the 0–5 millivolt range. The gain control 43 of the amplifier 38 was set at a predetermined level to provide a desired response in the recorder 39.

To carry out the described analytical technique, it is necessary to select a suitable sample size which may be as little as about 1 microliter up to as much as 1 milliliter, depending upon the bed volume of the combustion conduit 22. A preferred sample size is within the range from 10 to 100 microliters. To begin a particular analysis, the heating means 4 is turned on and brought to a temperature within the range from about 700° to about 1,100° C., preferably about 900° to 1,000° C. Oxygen is also turned on and the flow rate adjusted to a desired constant level so as to provide from about 0.2 to about 4, preferably 0.7 to 1.5, heated bed volumes thereof per minute. Depending on the size of the heated bed volume, the oxygen flow rate can be within the range from as little as 10 to 800 cubic centimeters (S.T.P.) per minute.

It is to be noted that the best oxygen flow rates will depend somewhat upon the heating zone 21 bed volume. For instance, small bed volumes with high oxygen flow rates or large bed volumes with oxygen flow rates that are too low will tend to engender erratic combustion with possible countercurrent diffusion of the combustion gases, such that the analytical results will tend to show poor reproducibility. Also, in this connection, it is to be pointed out that while integration calculations can be used to correlate the recorded signal with actual total carbon contents, the most convenient and rapid evaluation of the recorded signal is made by considering only the amplitude (peak height) of the recording curve. To obtain well defined amplitude, or sharp peaks, bed volume and oxygen flow rate conditions should be adjusted within the above-described limits in order to produce curves having amplitudes well defined within a relatively short period, e.g., from a little as 5 seconds up to no more than about 1 minute. For this purpose, several trial runs utilizing varying oxygen flow rates with a given combustion conduit 22 will provide basis for the selection of efficacious oxygen flow rates.

After the oxygen flow rate, temperature of the heating means 4 and carbon dioxide detecting means 7 have achieved operating readiness, a selected sample of the aqueous system to be analyzed is rapidly injected into the heating zone 21 of the combustion conduit 50 with the syringe 23. Within a short time, the continuous graphic recorder 39 will produce a curve 41 whose amplitude may be read directly in terms of the total carbon content of the sample tested or may be correlated with the total carbon content by reference to a standard calibration curve of curve amplitudes plotted against total carbon of previously analyzed known samples. Such standard calibration curves can be obtained for known aqueous systems containing a high purity organic material such as glacial acetic acid under operating conditions such that comparable analytical results are obtained.

For a given apparatus setup, simple test operations according to the procedure outlined above can be employed to determine optimum operating conditions within the aforedescribed operational limits. For the greatest reproducibility with the specific apparatus described above, it is desirable that oxygen flow rates be above a certain minimum, i.e., above about 40 cubic centimeters per minute but not more than about 200 cubic centimeters per minute, and that the quantity of carbonaceous materials present in the sample to be analyzed be within the range from about 5 to 150 parts per million. Within these operational levels, the results achieved are independent of variations in the parameters specified. However, it is preferred to establish optimum operating conditions and maintain such during all operations.

Numerous tests have been made on aqueous systems containing known amounts of carbon. In such operations small amounts of a carbonaceous material, such as those specified below, were added to deionized water to provide a predetermined proportion of carbon in parts per million. Four analyses of each standard solution were made using an apparatus like that described above. The results were statistically averaged to determine the percentage recovery, i.e., 100 times the carbon found, divided by the carbon calculated to be present. The sample size used was 20 microliters and the temperature within the furnace was 950° C. Oxygen was passed into the combustion tube at a constant rate of 50 cubic centimeters (S.T.P.) per minute. The systems analyzed and the results obtained are set forth in the following table.

TABLE I.—ANALYSES OF KNOWN SOLUTIONS

| Solute | Carbon in Parts Per Million | | | | Std.[1] Dev. | Avg. Percent Recovery |
|---|---|---|---|---|---|---|
| | Calculated | Found | | | | |
| | | Max. | Min. | Avg. | | |
| Benzoic acid | 68.8 | 69.0 | 67.4 | 68.2 | 0.66 | 99.1 |
| Phenol | 76.6 | 77.2 | 76.5 | 76.9 | 0.30 | 100.4 |
| Sucrose | 104.8 | 105.1 | 104.3 | 104.5 | 0.40 | 99.7 |
| Glycine | 100.7 | 101.2 | 99.5 | 100.3 | 0.69 | 99.6 |
| Pyridine | 105.6 | 104.4 | 103.6 | 104.2 | 0.40 | 98.7 |
| Urea | 100.0 | 100.9 | 99.1 | 99.8 | 0.86 | 99.8 |
| Sodium cyanide | 122.5 | 122.1 | 119.5 | 120.5 | 1.11 | 98.4 |
| Acetanilide | 75.4 | 76.0 | 75.0 | 75.4 | 0.48 | 100.0 |
| p-nitroaniline | 106.2 | 105.8 | 104.9 | 105.4 | 0.52 | 99.2 |
| 4-aminoantipyrine | 111.5 | 110.6 | 108.9 | 110.2 | 0.85 | 98.8 |
| Sulfanilic acid | 89.3 | 90.5 | 88.6 | 89.3 | 0.90 | 100.0 |
| Diphenylaminesulfonate, Ba salt | 87.8 | 87.6 | 86.8 | 87.4 | 0.40 | 99.5 |
| dl-methionine | 103.0 | 102.7 | 101.8 | 102.5 | 0.45 | 99.5 |
| 2,4,6-trichlorophenol | 75.4 | 76.0 | 74.0 | 75.0 | 0.84 | 99.5 |
| Sodium carbonate | 99.5 | 100.0 | 99.2 | 99.4 | 0.40 | 99.9 |
| Acetic acid in 20% NaCl | 100.0 | 101.0 | 99.0 | 100.0 | 0.82 | 100.0 |
| Acetic acid in 20% CaCl₂ | 100.0 | 100.0 | 98.1 | 99.1 | 0.78 | 99.1 |

[1] All results are based on 4 determinations. Calibrations were made with standard solutions of acetic acid in water.

For subsequent operations with aqueous systems of unknown quantities of carbonaceous materials, a standard calibration curve was made by analyzing known solutions of glacial acetic acid. The analytical operations were carried out as described above. Having prepared a standardization curve with the accumulated data whereby the recorded peak height could be correlated with the carbon content of the aqueous system being tested, subsequent determinations were made on unknown solutions in a like manner. Data accumulated in several runs with particular unknowns indicated highly reproducible analyses with a standard deviation of only plus or minus one part per million or one percent at the 100-part per million level.

While the foregoing illustrations deal chiefly with true solutions of carbonaceous materials, aqueous systems which comprise dispersions of finely divided solids are also efficiently analyzed for total carbon content in accordance with the method of the invention. It is only necessary in such instances that care should be exercised to insure that representative samples are obtained for analysis. Thus, in some instances it may be desirable to subject the aqueous system to be analyzed to shearing agitation in order to break down agglomerates into particle sizes within the capability of the injection means used. In other instances it may be necessary to filter out rough or comparatively large particles in order to avoid plugging of the injection means. In general, any aqueous system containing a small amount of highly dispersed carbonaceous matter can be analyzed regardless of whether the carbonaceous matter is dissolved or suspended.

While it is preferred in the interest of obtaining reproducible results to analyze aqueous systems containing no more than about 500 parts per million of highly dispersed carbonaceous material, it is possible to analyze aqueous systems with greater proportions of carbonaceous material by diluting representative samples thereof to appropriate concentration levels.

What is claimed is:

1. A method for rapidly determining the total carbon content of an aqueous system containing a small amount of highly dispersed carbonaceous matter which method comprises (1) passing a continuous stream of oxygen at a constant flow rate through a combustion conduit having a heated zone at a temperature within the range from about 700° to about 1,100° C., within which heated zone there is positioned a gas-permeable diffusing member at a distance into the heated zone from the inlet end thereof sufficient to define, in conjunction with the combustion conduit, a sample expansion zone within the heated zone of adequate volume to avoid the formation of condensate upstream from the heated zone, said diffusing member being of a material which is essentially chemically inert to oxygen and steam at the temperature of the heated zone;

(2) rapidly injecting a small predetermined amount of the aqueous system to be analyzed into the oxygen stream within the heated zone of the combustion conduit on the upstream side of the diffusing member;

(3) sweeping the gaseous product formed in the heated zone through the diffusing member and into a cooling zone by continuing the oxygen stream at the aforesaid constant flow rate whereby the gaseous product is cooled;

(4) thence sweeping the cooled gaseous product into an analyzer for quantitatively indicating the carbon dioxide in the gaseous product.

2. A method for rapidly determining the total carbon content of an aqueous system containing a small amount of highly dispersed carbonaceous matter which method comprises:

(1) passing a continuous stream of oxygen at a constant flow rate through a combustion conduit, said combustion conduit having a maximum cross-sectional area of about 7 square centimeters and a heated zone with a volume within the range from about 20 to about 200 cubic centimeters maintained at a combustion supporting temperature within the range from about 700° to about 1,100° C., within which heated zone there is a gas-permeable diffusing member at least about 0.5 centimeter long of a material, which is essentially chemically inert in the presence of oxygen and steam at the temperature of the heated zone, said diffusing member being positioned wtihin the combustion conduit at least about ⅓ of the distance through the heated zone as measured from the oxygen inlet end thereof;

(2) rapidly injecting a small predetermined amount of the aqueous system to be analyzed into the oxygen stream within the heated zone of the combustion conduit on the upstream side of the diffusing member;

(3) sweeping the gaseous product formed in the heated zone through the diffusing member and into a cooling zone by continuing the oxygen stream whereby the temperature of the gaseous product is lowered;

(4) thence sweeping the cooled gaseous product into an analyzer for quantitatively indicating the carbon dioxide in the gaseous product.

3. A method as in claim 2 wherein:
(1) the aqueous system to be analyzed contains from about 2 to about 500 parts per million of highly dispersed carbonaceous matter;
(2) the oxygen flow rate is within the range from about 1 to about 4 times the bed volume of the heated zone per minute; and
(3) the volume of the sample of the aqueous system to be analyzed is from about 0.005 to about 0.5 percent of the bed volume of the heated zone.

4. A method as in claim 2 wherein the aqueous system to be analyzed is rapidly injected into the oxygen stream within the heated zone in a direction essentially parallel to the longitudinal axis of the combustion conduit.

5. A method for rapidly determining the total carbon content of an aqueous system containing a small amount of highly dispersed carbonaceous matter which method comprises:
(1) passing a continuous stream of oxygen at a constant and predetermined flow rate through a combustion conduit, said combustion conduit having a maximum cross-sectional area of about 7 square centimeters and a heated zone with a volume within the range from about 20 to about 200 cubic centimeters maintained at a combustion supporting temperature within the range from about 700° to about 1,100° C., in which heated zone there is a gas-permeable diffusing member at least about 0.5 centimeter long of a material, which is essentially chemically inert in the presence of oxygen and steam at the temperature of the heated zone, said diffusing member being positioned within the combustion conduit at least about 1/5 of the distance through the heated zone, as measured from the oxygen inlet end thereof;
(2) rapidly injecting a small predetermined amount of the aqueous system to be analyzed in the oxygen stream within the heated zone of the combustion conduit on the upstream side of the diffusing member;
(3) sweeping the gaseous product formed in the heated zone through the diffusing member and into a cooling zone by continuing the oxygen stream at the aforesaid constant rate whereby the temperature of the gaseous product is lowered;
(4) thence sweeping the cooled gaseous product into an analyzer which produces an electrical voltage proportional to the carbon dioxide in the gaseous product, which electrical voltage is fed to a recorder; and
(5) calibrating the recorded indicia of the carbon dioxide concentration in the gaseous product against data obtained by analyzing aqueous systems containing known amounts of a carbonaceous material under comparable operating conditions, whereby the carbon content of the aqueous system is determined.

6. An apparatus for determining the total carbon content of an aqueous system containing a small amount of highly dispersed carbonaceous matter, which apparatus comprises:
(1) oxygen flow control means for maintaining a confined continuous oxygen stream from a pressurized source of supply at a constant and predetermined rate;
(2) a combustion conduit having an inlet and an outlet, said combustion conduit being coupled at the inlet to the oxygen flow control means and having a heating zone in which there is a gas-permeable diffusing member of a material which is essentially chemically inert to oxygen and steam at combustion supporting temperatures, said diffusing member being positioned within the heating zone of the combustion conduit at a distance from the inlet thereof sufficient to define in conjunction with the combustion conduit a sample expansion zone of adequate volume to avoid the formation of condensate upstream from the heating zone, and said combustion conduit being adapted at the oxygen inlet end thereof to receive sample injection means for rapidly injecting a small predetermined amount of the aqueous system to be analyzed into the heating zone;
    (a) heating means in heat exchange relationship with the combustion conduit for maintaining the heating zone thereof at a controlled combustion supporting temperature;
(3) cooling means coupled to the outlet of the combustion conduit in which the temperature of the gaseous product received from the heating zone is cooled;
    (a) condensate removal means integral with the cooling means wherein condensate is separated from the cooled gaseous product; and
(4) carbon dioxide detection means coupled to said cooling means for quantitatively indicating the carbon dioxide in the gaseous product from the heating zone;

said oxygen flow control means, combustion conduit, cooling means, and carbon dioxide detection means being coupled in the order specified by suitable interconnecting conduits to provide a continuous gas train.

7. An apparatus for rapidly determining the total carbon content of an aqueous system containing a small amount of a highly dispersed carbonaceous matter which apparatus comprises:
(1) oxygen supply means for providing a confined, continuous oxygen stream at a constant and predetermined rate;
(2) a combustion conduit having a heating zone in which there is a gas-permeable diffusing member of a material essentially chemically inert to oxygen and steam at combustion supporting temperatures, said combustion conduit being connected with the oxygen supply means and adapted to receive sample injection means at one end, and at the opposite end, adapted to discharge the gaseous product formed in the heating zone into a confined cooling zone, and said diffusing member being positioned within the heating zone of the combustion conduit at least about 1/5 of the distance through the heating zone as measured from the oxygen inlet end thereof;
    (a) sample injection means connected with the combustion conduit for rapidly injecting a small predetermined amount of the aqueous system to be analyzed into the heating zone of the combustion conduit on the upstream side of the diffusing member;
    (b) heating means in heat exchange relationship with the combustion conduit for maintaining the heating zone thereof at a controlled combustion supporting temperature;
(3) cooling means connected to the combustion conduit in which the temperature of the gaseous product received from the heating zone is cooled;
    (a) condensate removal means integral with the cooling means wherein condensate is separated from the cooled gaseous product; and
(4) carbon dioxide detection means connected to the condensate removal means for quantitatively indicating the carbon dioxide in the gaseous product from the heating zone;

said oxygen supply means, combustion conduit, cooling means and carbon dioxide detection means being connected in the order specified by suitable interconnecting conduits to provide a gas train.

8. An apparatus as in claim 7 wherein the heating means is adapted to provide a combustion supporting temperature within the range from about 700° to about 1,100° C.

9. An apparatus as in claim 7 wherein the combustion conduit has a maximum cross-sectional area of about 7 square centimeters and a heating zone bed volume within the range from about 20 to about 200 cubic centimeters and the heating means is adapted to provide a combustion supporting temperature within the range from about 700° to about 1,100° C.

10. An apparatus as in claim 7 wherein the combustion conduit has a maximum cross-sectional area of about 7 square centimeters and a heating zone bed volume within the range from about 20 to about 200 cubic centimeters, the sample injection means is adapted for rapidly injecting a volume of the aqueous system to be analyzed which is from about 0.005 to about 0.5 percent of the heating zone bed volume, and the heating means is adapted to provide a combustion supporting temperature within the range from about 700° to about 1,100° C.

11. An apparatus as in claim 7 wherein the oxygen supply means is adapted to provide oxygen at a constant flow rate within the range from about 1 to about 4 times the heating zone bed volume per minute, the combustion conduit has a maximum cross-sectional area of about 7 square centimeters and a heating zone bed volume within the range from about 20 to about 200 cubic centimeters, the sample injection means is adapted for rapidly injecting a volume of the aqueous system to be analyzed which is from about 0.005 to about 0.5 percent of the heating zone bed volume, and the heating means is adapted to provide a combustion supporting temperature within the range from about 700° to about 1,100° C.

12. An apparatus for rapidly determining the total carbon content of an aqueous system containing a small amount of a highly dispersed carbonaceous matter which apparatus comprises:

(1) oxygen supply means for providing a confined, continuous oxygen stream at a constant and predetermined rate;

(2) a combustion conduit which is an essentially cylindrical tube of a material resistant to oxygen and steam at combustion supporting temperatures, with a maximum diameter of 3 centimeters, having a heating zone bed volume within the range from 20 to 200 cubic centimeters, within which heating zone there is a diffusing member at least 0.5 centimeter long constructed of a material essentially chemically inert to oxygen and steam at elevated combustion supporting temperatures, said combustion conduit being connected with the oxygen supply means and adapted to receive sample injection means at one end, and at the opposite end, adapted to discharge the gaseous product formed in the heating zone into a confined cooling zone, and said diffusing member being positioned within the heating zone of the combustion conduit at least about 1/5 of the distance through the heating zone as measured from the oxygen inlet end thereof;

(a) sample injection means connected with the combustion conduit for rapidly injecting in a direction essentially parallel to the longitudinal axis of the combustion conduit a small predetermined amount of the aqueous system to be analyzed into the heating zone of the combustion conduit on the upstream side of the diffusing member;

(b) heating means in heat exchange relationship with the combustion conduit for maintaining the heating zone thereof at a controlled combustion temperature within the range from about 700° to about 1,100° C.;

(3) cooling means connected to the combustion conduit in which the temperature of the gaseous product received from the heating zone is cooled to a temperature whereby condensate is formed;

(a) condensate removal means integral with the cooling means wherein condensate is separated from the cooled gaseous product; and (4) carbon dioxide detection means connected to the cooling means for quantitatively indicating carbon dioxide in the gaseous product from the heating zone, which consists of a non-dispersive type, infrared analyzer, sensitized to carbon dioxide, which analyzer produces a signal in the form of a variable voltage, which signal is fed to a low voltage amplifier and the enhanced signal is fed to a graphic recorder;

said oxygen supply means, combustion conduit, cooling means, and carbon dioxide detection means being connected in the order specified by suitable interconnecting conduits to provide a gas train.

13. An apparatus as in claim 12 wherein the combustion conduit is constructed of siliceous material.

14. An apparatus as in claim 12 wherein the diffusing member comprises ignited asbestos fibers.

15. An apparatus as in claim 12 wherein the combustion conduit has a heating zone containing in addition to the diffusing member a platinum gauze downstream from the diffusing member.

References Cited by the Examiner

UNITED STATES PATENTS

| 1,515,237 | 11/1924 | Yensen | 23—230 |
| 2,417,321 | 3/1947 | Park et al. | 250—43.5 |
| 2,555,327 | 6/1951 | Elliott | 250—43.5 |
| 2,698,390 | 12/1954 | Liston | 250—43.5 |

RALPH G. NILSON, *Primary Examiner.*

W. F. LINDQUIST, *Assistant Examiner.*